(12) United States Patent
Koukoulidis et al.

(10) Patent No.: US 7,076,657 B2
(45) Date of Patent: Jul. 11, 2006

(54) USE OF SHORT MESSAGE SERVICE (SMS) FOR SECURE TRANSACTIONS

(75) Inventors: Vassilios Koukoulidis, Delray Beach, FL (US); George Stamatelos, Delray Beach, FL (US); Rick Jezierny, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 732 days.

(21) Appl. No.: 10/034,496

(22) Filed: Dec. 28, 2001

(65) Prior Publication Data

US 2003/0123669 A1    Jul. 3, 2003

(51) Int. Cl.
*H04L 9/14* (2006.01)
(52) U.S. Cl. .................. 713/171; 380/270; 380/282
(58) Field of Classification Search ............. 713/171; 380/270, 282
See application file for complete search history.

(56) References Cited

U.S. PATENT DOCUMENTS

| 6,748,082 | B1 * | 6/2004 | Vieweg et al. | 380/278 |
|---|---|---|---|---|
| 6,768,942 | B1 * | 7/2004 | Chojnacki | 701/200 |
| 2002/0028686 | A1 * | 3/2002 | Kagi | 455/466 |
| 2002/0115424 | A1 * | 8/2002 | Bagoren et al. | 455/408 |
| 2003/0054844 | A1 * | 3/2003 | Anvekar et al. | 455/466 |

OTHER PUBLICATIONS

Gipson, Melinda, the digital edge, Get to Know the Wireless Players, Aug. 1999, www.digitaledge.org/monthly/1999_09/players.html, p. 1-3.*

3rd Generation Partnership Project; Technical Specification Group Terminals; Technical realization of the Short Message Service (SMS); Release 5; 3GPP TS 23.040, V5.1.0 (Sep. 2001).

"Feature-High-tech heart devices deliver data over the Web", by Debra Sherman, Aug. 8, 2001, URL:http://www.idgnet.com/english/crd_data_770346.html.

"Security of the WEP algorithm", Borisov et al., 2001, URL: http://www.isaac.cs.berkeley.edu/isaac/wep-faq.html.

"Intercepting Mobile Communications: The Insecurity of 802.11", Borisov et al., 2001, URL: http://www.isaac.cs.berkeley.edu/isaac/mobicom.pdf.

"802.11 Wireless Networks: Is Yours Really Safe?" by Mark Edwards, Aug. 15, 2001, URL: http://www.windowsitsecurity.com/Articles/Index.cfm?ArticleID=22147.

* cited by examiner

*Primary Examiner*—Matthew Smithers
(74) *Attorney, Agent, or Firm*—Francis G. Montgomery

(57) ABSTRACT

A system and method is presented for establishing a secure conduit for SMS communication between a center and a wireless terminal. The center encrypts an authorization key in response to a wireless terminal's SMS message containing a public key and a request for the authorization key, sends back to the wireless terminal an SMS message containing the encrypted authorization key, decrypts another SMS message received from the wireless terminal which contains an authentication code and a request for a traffic key, authenticates the SMS message, encrypts the traffic key, and sends to the wireless terminal another SMS message containing the traffic key.

18 Claims, 3 Drawing Sheets

USE OF SHORT MESSAGE SERVICE (SMS) FOR SECURE TRANSACTIONS

BACKGROUND OF THE INVENTION

1. Field of the Invention

The present invention relates to secure transactions. More particularly, the present invention relates to utilizing SMS technology and features for the purpose of establishing secure encrypted transactions.

2. Description of Related Art

In a wireless network, terminals, such as wireless telephones, may be used to communicate in a variety of ways. For example, a simple wireless telephone is used to convey speech, but more sophisticated telephones may be used to send text messages. A popular service for sending text messages utilizes terminals having the Short Messages Services (SMS) feature. The most widely used application of SMS is for wireless telephone users to send short alphanumeric messages to one another. Other SMS applications include receiving e-mail alerts, such as when a longer e-mail was received by the user or when a stock reaches a certain price.

Though popular, SMS has not been widely used for applications that require secure transactions. While the SMS feature built into many wireless telephones is useful for normal communications, secure transactions, such as credit card transactions, require a higher level of security that includes encryption.

A relatively new standard for mobile communication is the Universal Mobile Telecommunications System (UMTS). Though this system is capable of providing secure communications the system requires greater bandwidth than SMS and is not widely available at this time. While it is generally true that SMS can be implemented on UMTS systems, the disadvantages of UMTS remain. Thus UMTS is not available or not feasible for most wireless systems in use today.

SUMMARY OF THE INVENTION

It is therefore an object of the invention to provide a system and method for conducting secure transactions utilizing SMS.

It is another object of the invention to provide a system and method for conducting secure transactions over networks that allow SMS messaging.

It is yet another object of the invention to provide a system and method for conducting credit card transactions utilizing SMS.

It is yet another object of the invention to provide user authorization and authentication for financial transactions conducted over an SMS service.

It is yet another object of the invention to provide user authorization and authentication for medical information conducted over an SMS service.

It is yet another object of the invention to exchange keys between two parties over an SMS service to establish a secure connection.

The invention uses applied cryptography to provide a secure conduit for the communication of sensitive information between two parties over an SMS service. For example, a credit card holder and a credit card center may establish a secure connection prior to engaging in a financial transaction.

The establishment and utilization of a secure conduit is accomplished in three phases.

In the first phase, authorization takes place by having a first party with a wireless terminal submit a message request containing the first party's public key to a second party at a center. The center responds with an authorization key that is encrypted using RSA software and the first party's public key. The wireless terminal, upon receiving the encrypted authorization key, utilizes RSA software and the first party' private key to decrypt the authorization key. Both parties now have the same authorization key, and each side can independently generate three additional keys: a key encryption key, and upstream message authentication key, and a downstream message authentication key.

In the second phase, the wireless terminal sends a request for a traffic key. The center, upon receiving and authenticating the request, sends a traffic key.

In the third phase, the desired confidential data is encrypted and exchanged in a secure communication between the wireless terminal and center.

The architecture of the network supporting this use of the SMS can be established either by having each party encrpyt/decrypt messages at it own end as described above. Alternatively, at least one intermediary can encrypt/decrypt and/or authenticate on behalf of a party, and use a dialup or other secure connection to communicate on behalf of the party it is representing.

The invention may be implemented over networks that support SMS, which is an advantage over technologies that are dependent on underlying network technology that is not widely available. Advantageously, SMS requires lower bandwidth than many other digital means of communication.

DETAILED DESCRIPTION

SMS services may be used to send sensitive information over a wireless network. Such sensitive information may be, by way of example only, credit card information or medical information, though other types of information may be sent. In a preferred embodiment described below, a user having credit card information utilizes the invention to conduct a credit card transaction through a wireless telephone with a credit card center.

Figure 1A:
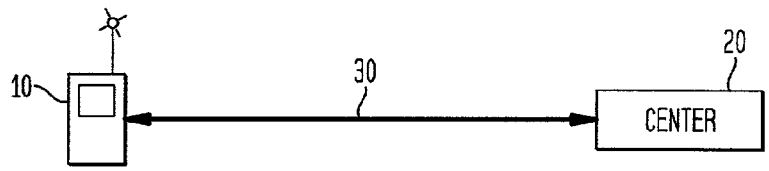
FIG. 1A is a diagram representing an example of the authorization phase in the establishment of a secure conduit for conveying sensitive data through an SMS service.
Figure 1B:
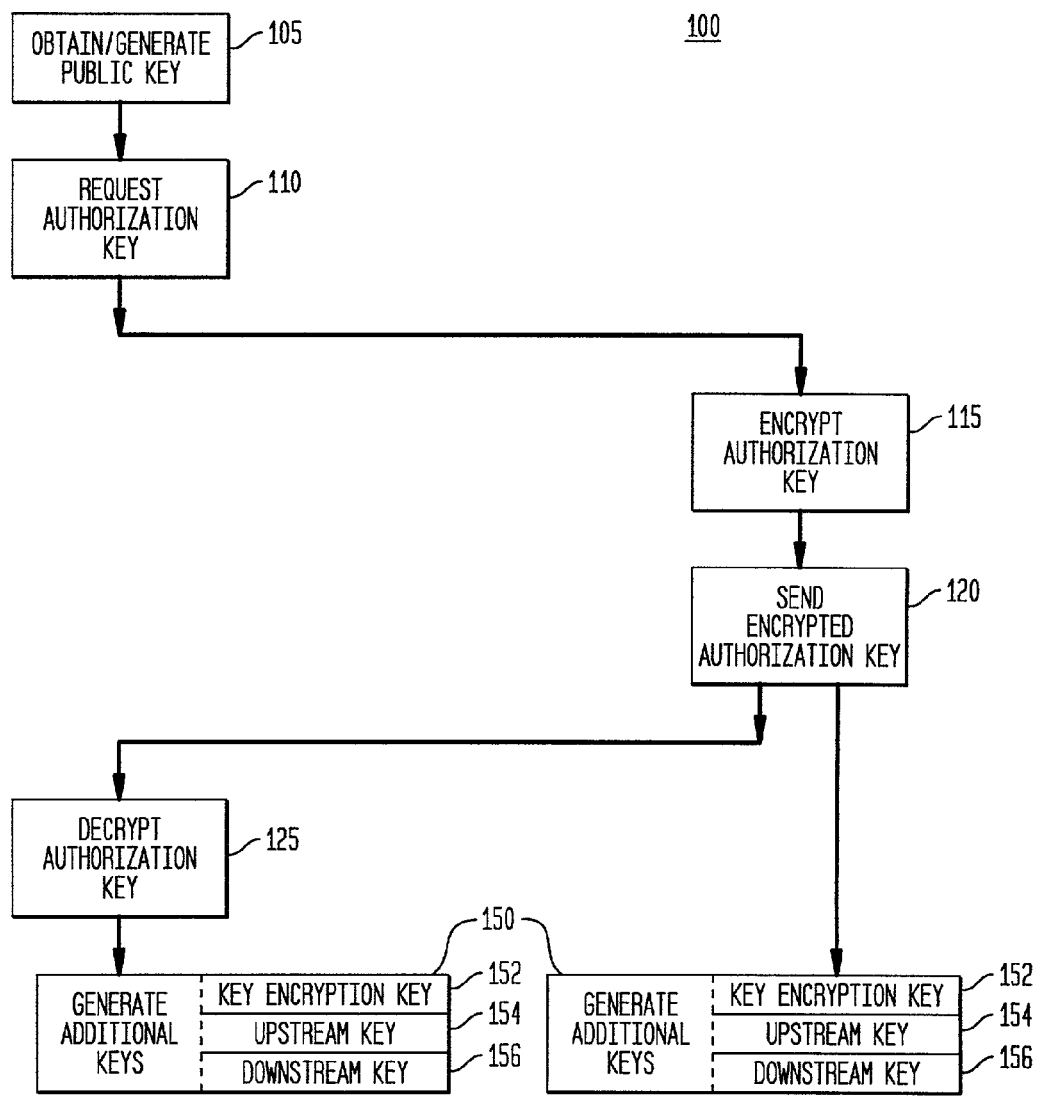
FIG. 1B is a flow diagram of the authorization phase of FIG. 1A.

With reference to FIG. 1A, authorization takes place between user's wireless terminal 10 and center 20, which in a preferred embodiment is a credit card center, using authorization communication 30. With reference to FIG. 1B, authorization phase flow chart 100 is shown. Wireless terminal 10 obtains or generates 105, if it does not already have one, user's public key. Wireless terminal 10 submits a message 110 requesting an authorization key. The message request includes user's public key which, in a preferred embodiment, comprises a 96 byte modulus and a 3 byte exponent, although other types of public keys may be used in other preferred embodiments. Center 20 encrypts 115 an authorization key and responds to wireless terminal 10 by sending a message 120 with the encrypted authorization key. In a preferred embodiment, the authorization key is 8 bytes long and is encrypted using cryptographic means, such as the RSA public-key cryptosystem which is part of the BSAFE software package provided by RSA Security located in Bedford, Mass. and the public key contained in message 110. Wireless terminal 10, upon receiving message 120 comprising the encrypted authorization key, decrypts 125 the authorization key. In a preferred embodiment, the authorization key is decrypted utilizing cryptographic means, such as RSA software and the first party's private key. Now that both parties have the same authorization key, each party can independently generate 150 three additional matching keys: a key encryption key 152, and upstream message authentication key 154, and a downstream message authentication key 156. As described in further detail below, upstream message authentication key 154 is used to authenticate upstream requests; downstream message authentication key 156 is used to authenticate downstream replies; and key encryption key 152 is used to realize the secure transmission of yet another key (a traffic key, not shown) that will be used for data ciphering (for example, encrypting credit card information).

Figure 2A:
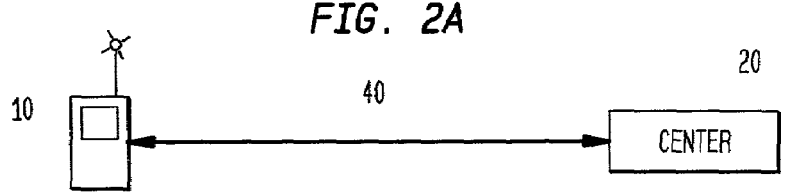
FIG. 2A is a diagram representing an example of the authentication phase in the establishment of a secure conduit for conveying sensitive data through an SMS service.
Figure 2B:
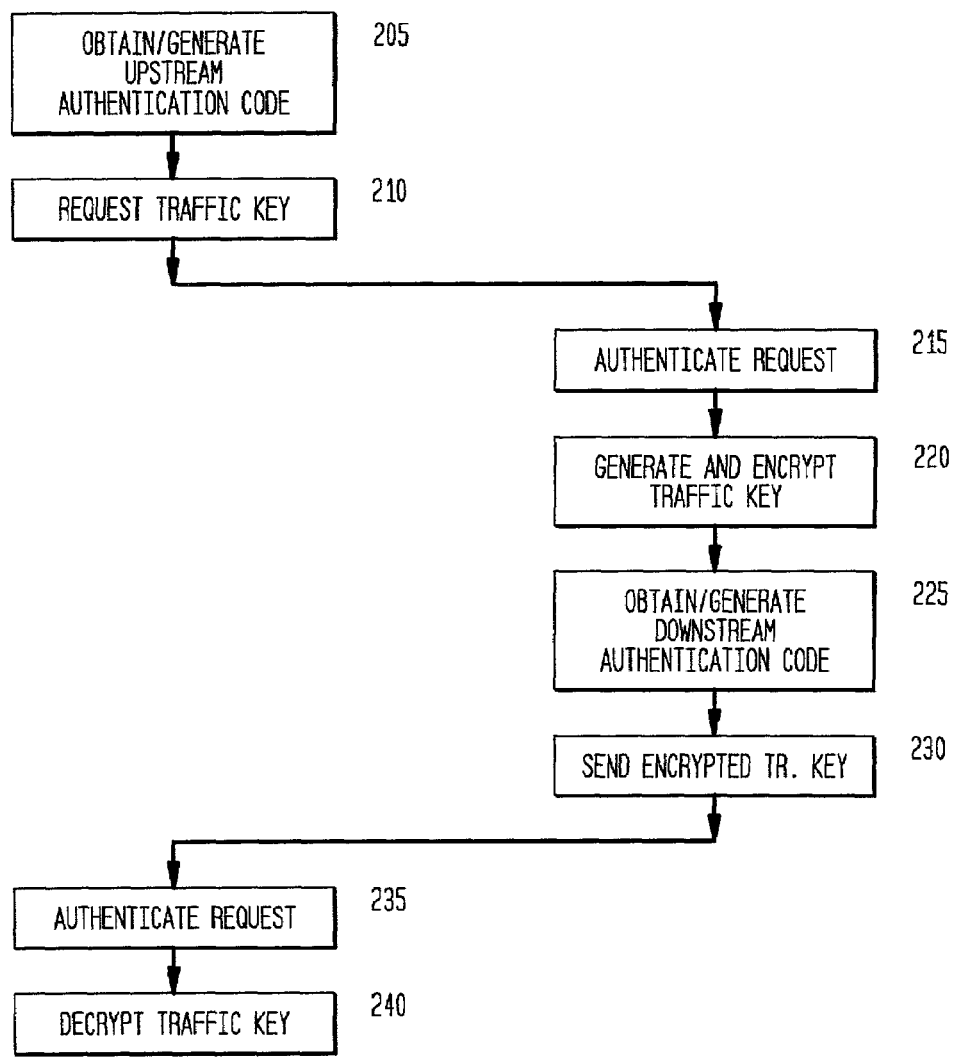
FIG. 2B is a flow diagram of the authorization phase of FIG. 2A.

With reference to FIG. 2A, authentication of wireless terminal 10 takes place using authentication communication 40 with center 20. With reference to FIG. 2B, authorization phase flow chart 200 is shown. If wireless terminal 10 does not have an upstream authentication code, it obtains or generates 205 an upstream authentication code. In a preferred embodiment, the upstream authentication code is a hash-based message authentication code (HMAC) digest, which is a fixed-length string of code produced by taking a variable length input and upstream message authentication key 154. Wireless terminal 10 submits an encrypted message 210 having the upstream authentication code and requesting a traffic key.

Upon receiving message 210, center 20 uses an upstream message authentication key means, such as upstream message authentication key 154 and Secure Hash Algorithm 1 (SHA-1) developed by the National Institute of Standards and Technology, to authenticate 215 the request. If authentication 215 is successful, center 20 generates (if does not already have the traffic key) and encrypts 220 a traffic key using key encryption key 152. In a preferred embodiment, center 20 generates and encrypts 220 an 8 byte traffic key using Data Encryption Standard (DES). In another preferred embodiment, center 20 generates and encrypts 220 a 16 byte traffic key using Advanced Encryption Standard (AES).

Center 20 generates 225 a downstream authentication code. In a preferred embodiment, the downstream authentication code is a hash-based message authentication code (HMAC) digest, which is a fixed-length string of code produced by taking a variable length input and downstream message authentication key 156. Center 20 sends 230 a message (which, in a preferred embodiment, contains the HMAC digest of center 20) containing the encrypted traffic key back to wireless terminal 10. After receiving the message from center 20 containing the encrypted traffic key, wireless terminal 10 authenticates 235 the message using downstream message authentication key 156, and decrypts 240 the traffic key in the message using key encryption key 152.

Figure 3:
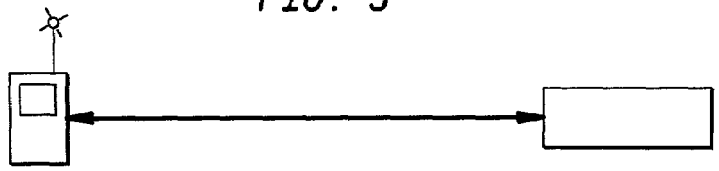
FIG. 3 is a diagram representing an example of the data encryption phase, which utilizes a secure conduit for conveying sensitive data through an SMS service.

With reference to FIG. 3 secure information can now be exchanged between wireless terminal 10 and center 20 using a conduit for secure encrypted communication 50 that has been established through the first two phases described above. In a preferred embodiment, the traffic key and a symmetric encryption algorithm, such as DES or AES by way of example, is employed for the actual data encryption/decryption. It should be noted that generally the longer the length of the key(s) being employed, the more difficult it is for unauthorized persons to compromise the security of the scheme (AES for example offers 128, 192 or 256 bits cryptographic keys, whereas the older DES offers 40 or 56 bits options for key lengths). The limits on the length of SMS service messages, however, may introduce limitations on key length. Nevertheless, the availability of concatenation of SMS messages (as described in ($3^{rd}$ Generation Partnership Project technical specification (3GPP TS) 23.040 V5.1.0 section 9.2.3.24.1, available at http://www.3gpp.org and incorporated herein by reference) may be used to allow exchanges of increased length keys.

Figure 4:
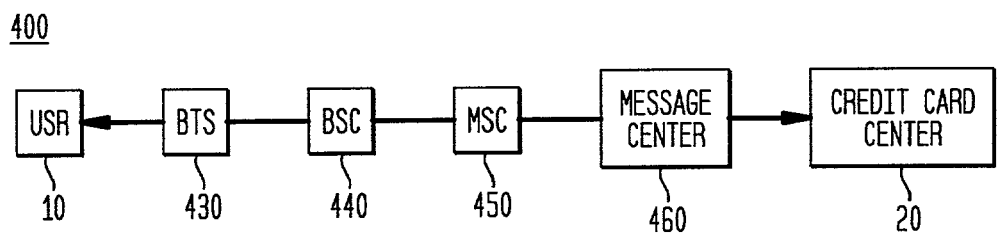
FIG. 4 is a diagram representing a preferred embodiment for a network architecture for implementing the invention.

The invention is implemented in a wireless network scenario. With reference to FIG. 4, in a preferred embodiment authorization communication 30, authentication communication 40, and secure encrypted communication 50 take place over conduit 400. Wireless terminal 10 sends and receives wireless signals to/from base transceiver station (or base station) 430, which communicates with base station controller 440. Base station controller 440 communicates with mobile switch center 450, which communicates with SMS message center 460. Message center 460 communicates with center 20, which is a credit card center. The method by which wireless terminal 10 communicates with base transceiver station 430, base transceiver station 430 communicates with base station controller 440, base station controller 440 communicates with mobile switch center 450, mobile switch center 450 communicates with SMS message center 460, and SMS message center 460 communicates with center 20 is known to those of ordinary skill in the art of wireless networks.

Figure 5:
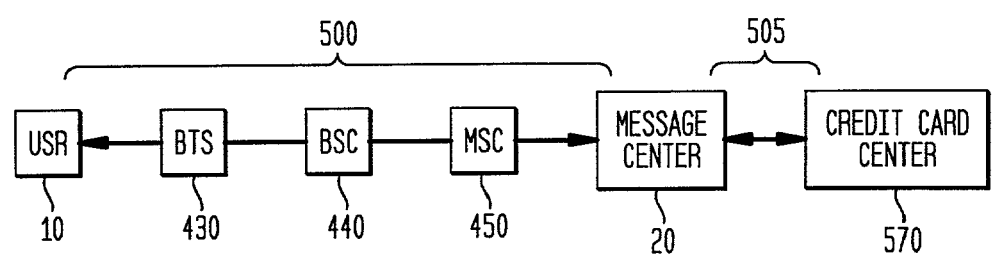
FIG. 5 is a diagram representing another preferred embodiment for a network architecture for implementing the invention.

In an alternative preferred embodiment, shown in FIG. 5, center 20 is an SMS message center. In this embodiment authorization communication 30, authentication communication 40, and secure encrypted communication 50 take place over conduit 500. A dialup or other secure connection forms a non-SMS conduit 505 to convey information between SMS message center 20 and credit card center 570.

While the invention has been described in terms of preferred embodiments, those skilled in the art will recognize that the invention can be practiced with modification within the spirit and scope of the appended claims.

We claim:

1. A method for establishing a secure conduit for SMS communication with a wireless terminal, comprising:
   a) encrypting an authorization key in response to a first SMS message from the wireless terminal comprising a public key and a request for the authorization key;
   b) sending to the wireless terminal a second SMS message comprising the encrypted authorization key;
   c) decrypting a third SMS message from the wireless terminal comprising an authentication code and a request for a traffic key;
   d) authenticating the third SMS message;
   e) encrypting the traffic key; and f) sending to the wireless terminal a fourth SMS message comprising the traffic key.

2. The method of claim 1, further comprising:

generating at least three keys, comprising a key encryption key, an upstream message authentication key, and a downstream authentication key.

3. The method of claim 1, wherein the wireless terminal is a wireless telephone.

4. The method of claim 1, wherein the authentication code is a hash-based message authentication code digest.

5. The method of claim 1, wherein the secure conduit is for conveying credit card transactions.

6. The method of claim 1, wherein the secure conduit is for conveying medical information.

7. An apparatus for establishing a secure conduit for SMS communication with a wireless terminal, comprising:
   a) first cryptographic means for encrypting an authorization key in response to a first SMS message from the wireless terminal comprising a public key and a request for the authorization key;
   b) communication means for sending to the wireless terminal a second SMS message comprising the encrypted authorization key;
   c) second cryptographic means for decrypting a third SMS message from the wireless terminal comprising an authentication code and a request for a traffic key;
   d) upstream message authentication key means for authenticating the third SMS message; and
   e) third cryptographic means for encrypting the traffic key;
   wherein the communication means is also means for sending to the wireless terminal a fourth SMS message comprising the traffic key.

8. The apparatus of claim 7, further comprising:

fourth cryptographic means for generating at least three keys, comprising a key encryption key, an upstream message authentication key, and a downstream authentication key.

9. The apparatus of claim 7, wherein the wireless terminal is a wireless telephone.

10. The apparatus of claim 7, wherein the authentication code is a hash-based message authentication code digest.

11. The apparatus of claim 7, wherein the secure conduit is for conveying credit card transactions.

12. The apparatus of claim 7, wherein the secure conduit is for conveying medical information.

13. A computer-readable medium having stored thereon a plurality of instructions, the plurality of instructions including instructions which, when executed by a processor, cause the processor to establish a secure conduit for SMS communication with a wireless terminal, by:
   a) encrypting an authorization key in response to a first SMS message from the wireless terminal comprising a public key and a request for the authorization key;
   b) creating a second message comprising the encrypted authorization key;
   c) decrypting a third SMS message from the wireless terminal comprising an authentication code and a request for a traffic key;
   d) authenticating the third SMS message;
   e) encrypting the traffic key; and
   f) creating a fourth message comprising the traffic key.

14. The computer-readable medium of claim 13, wherein the plurality of instructions includes further instructions which, when executed by a processor, cause the processor to perform the additional step of:

generating at least three keys, comprising a key encryption key, an upstream message authentication key, and a downstream authentication key.

15. The computer-readable medium of claim 13, wherein the wireless terminal is a wireless telephone.

16. The computer-readable medium of claim 13, wherein the authentication code is a hash-based message authentication code digest.

17. The computer-readable medium of claim 13, wherein the secure conduit is for conveying credit card transactions.

18. The computer-readable medium of claim 13, wherein the secure conduit is for conveying medical information.

\* \* \* \* \*